United States Patent
Sharangpani

[19]

[11] Patent Number: 5,805,486
[45] Date of Patent: *Sep. 8, 1998

[54] MODERATELY COUPLED FLOATING POINT AND INTEGER UNITS

[75] Inventor: Harshvardhan Sharangpani, Santa Clara, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 563,499

[22] Filed: Nov. 28, 1995

[51] Int. Cl.⁶ ........................................................ G06F 7/38
[52] U.S. Cl. ................................. 364/736.04; 364/748.01
[58] Field of Search ......................... 364/715.01, 715.03, 364/736, 748

[56] References Cited

U.S. PATENT DOCUMENTS

| | | | |
|---|---|---|---|
| 4,833,599 | 5/1989 | Colwell et al. | 395/583 |
| 4,894,768 | 1/1990 | Iwasaki et al. | 395/200.01 |
| 5,574,939 | 11/1996 | Keckler et al. | 395/800 |

OTHER PUBLICATIONS

IEEE Standard for Binary Floating–Point Arithmetic (ANSI/IEEE Std 754–1985).

IEEE Standard for Radix–Independent Floating–Point Arithmetic (ANSI/IEEE Std 854–1987).

MC88110 Second Generation RISC Microprocessor User's Manual; Motorola Inc., 1991.

*Primary Examiner*—Chuong Dinh Ngo
*Attorney, Agent, or Firm*—Blakely, Sokoloff, Taylor & Zafman

[57] ABSTRACT

A moderately coupled floating point and integer units of a processor allows for rapid transfer of data between the two units. The integer unit is comprised of a plurality of integer registers arranged into an integer register file and coupled to one or more integer execution units. Similarly, the floating point unit is comprised of a plurality of floating point registers arranged into a floating point register file and coupled to one or more floating point execution units. The two units operate as separate units except for the data transfer between them on a transfer bus. The transfer bus is the only direct data link between the two register files. Multiplexers are used to control the bit transfer between the two register files so that all or some of the bits of a register are transferred to a receiving register. Furthermore, the data transfer scheme allows for both numeric and Booleans to be transferred and compounding of Booleans can be performed in either numeric unit.

10 Claims, 8 Drawing Sheets

MODERATELY COUPLED FLOATING POINT AND INTEGER UNITS

BACKGROUND OF THE INVENTION

1. Field of the Invention

The present invention relates to the field of microprocessors and, more particularly, to a transfer of information between integer and floating point units.

2. Related Application

This application is related to copending application titled "Method Of Transferring Data Between Moderately Coupled Integer And Floating Point Units;" Ser. No. 08/563,682; filed Nov. 28, 1995.

3. Prior Art

The use of integer and floating point units within or in conjunction with a microprocessor is well-known in the art. The integer unit provides the basic arithmetic and logical operations for the processor when the information is in integer format and the floating point unit provides the same in floating point format when floating point operations are to be performed. Usually, there are two sets of registers, one for the integer unit and the second for the floating point unit. Furthermore, the bit-length of the two register sets may differ in order to accommodate the higher-precision capability of the floating point unit. For example, the integer registers may each be of 32-bits in length, while the floating point registers may each be of 64-bits or greater.

In current microprocessor technology, a typical integer unit is comprised of a number of registers for storing information and one or more execution units for operating on the stored information based on instructions conveyed to the execution unit(s). The registers for the integer unit are referred to as a file, such as a register file or an integer register file (also called an integer file). Apart from the integer execution unit(s), the register files are also coupled to a bus for transfer of information to other units, such as memory. Thus, information can be loaded from memory to the integer register file, be operated on by the integer unit (which calculation is returned to the register file) and the result ultimately stored back in memory.

The floating point unit is configured similarly to the integer unit in that it is also comprised of a number of registers which load and store information from other units, such as memory. The floating point unit also has execution unit(s) which operate based on floating point instructions. An advantage of a floating point unit is its ability to provide support for complex numerical and scientific calculations on data in floating point format.

In the course of numeric computation, it is often necessary to perform operations that resemble integer manipulation on floating point values, and occasionally the reverse may be required. Thus, it is a typical operation to transfer a particular data from one unit to the other, have the computation performed and then the resultant data returned to the first unit. Some examples of such coupling operations (operations that couple floating point computation to integer computation) are noted below. It is appreciated that these examples are not the only operations available and are being provided herein for illustrative purpose only.

1) Exponent operation: Adding integer value to an exponent of a floating point number to scale the number.

2) Sign operation: Reversing the sign of a number.

3) Mantissa operation: Inserting or OR'ing in (also referred to as "jamming") explicit 1s into any of the mantissa positions in order to clamp a number to a certain defined value.

4) Boolean operation: Compounding Boolean values generated as a result of integer compares, as well as floating point compares.

5) Inter-conversion operation: Multiplying a floating point value with an integer value currently in the integer register file, which will require the movement of the integer value to the floating point register file and converting it into floating point format.

Generally in the present art of microprocessors, single precision calculations have been performed on single precision data format, which has been defined as a bit length of 32 bits. Floating point operations, on the other hand, have been performed on double precision data format, which has been defined as a bit length of 64 bits. Accordingly, integer register files had registers of 32 bits in length, while floating point register files had registers of 64 bits in length. The manipulation of single and double precision formats was simplified from the fact that the double precision format was exactly twice the length of the single precision format.

However, some microprocessors have extended the floating point capability to more than double precision. One microprocessor family developed by Intel Corporation commonly referred to as the x86 family of microprocessors (most notably, 80386, 80486 and Pentium® microprocessors) use an extended precision floating point format. The extended precision is an extension of the 64-bit double precision format and conforms to ANSI/IEEE (American National Standard/The Institute of Electrical and Electronics Engineers) standard 754, which was published Aug. 12, 1985 and is titled "IEEE Standard for Binary Floating-Point Arithmetic." The extended precision format is defined to have a bit length of 80 bits.

A current trend of microprocessor design is to extend the integer registers to have a bit-length of 64 bits. Such a design requirement is a prerequisite for microprocessors utilizing a 64-bit architecture (64 bits of addressing and data). Thus, integer units will utilize integer registers having 64 bits in length, while floating point units will utilize floating point registers having 80 bits in length. Accordingly, coupling of the integer and floating point computations via coupling of the register files will involve 64-to-80 bit transfers (and vice versa), when extended precision formats are utilized. Additionally, there is a preference to optimize floating point double precision calculations as well and, hence, movement of 64-bit quantities to/from the floating point registers is also being optimized.

It is appreciated that there are a number of techniques known in the prior art for coupling data between the integer and floating point units in a microprocessor. Some processor systems rely on a sparsely coupled (or even decoupled) structures, while other processors rely on closely coupled structures. As will be described in the description, sparsely coupled systems provide simplicity and potential for higher machine cycle times or frequency by having less circuit structures, but at the sacrifice of various data manipulation capability. Alternatively, closely (or fully) coupled units provide significant flexibility and substantial data manipulation capability, but at the cost of added complexity by having additional circuit structures. Such complexity can result in significant performance problems for the processor. For example, the required additional wiring adds capacitive loads to the circuit and slows frequency of operation of the processor. This performance degradation affects other functions of the device as well and not just the operations needed for the integer floating point data coupling.

It is appreciated that what is needed is a processor having an integer and floating point coupling structure which is not overly complex but at the same time providing more data manipulation capability than the sparsely coupled architecture. This structure should implement an innovative and streamlined solution in order to provide the benefits of data coupling, yet allow for a simpler mechanism which will permit higher frequency of operation for the processor.

SUMMARY OF THE INVENTION

The present invention describes a moderately coupled floating point and integer units of a processor. The integer unit is comprised of a plurality of integer registers arranged into an integer register file. The integer unit also includes one or more integer execution unit(s) which are coupled to the integer register file. Similarly, the floating point unit is comprised of a plurality of floating point registers arranged into a floating point register file. The floating point unit also includes one or more floating point execution unit(s). The integer unit provides integer calculations, while the floating point unit provides floating point calculations.

The execution unit(s) of the integer unit are isolated from the floating point unit and conversely the execution unit(s) of the floating point unit are isolated from the integer unit. The only direct data link between the two units is through a specialized transfer bus coupling the two register files. Thus, the floating point and integer units operate as separate numeric units with direct data transfer between the two register files being effected on the transfer bus.

Since the floating point unit is designed to accommodate extended precision numeric format, the floating point registers are 80-bit length registers. The integer registers are designed as a 64-bit register. Due to the different formatting and the length size of the register files, a switching circuit is associated with the data transfer between the two register files. The switching circuit controls which bits of a register are transferred and to which bit positions of a receiving register. With this arrangement, a 64-bit mantissa value is transferred from a floating point register to a receiving integer register. A second transfer is utilized to transfer the 16-bit sign/exponent component to the lower bit segment of a second integer register. A reverse process is used to transfer two integer values to the mantissa and sign/exponent fields that form a floating point word. When the transfers are performed, zero values are used to fill in (pad) the unfilled bit positions of a receiving register, if there are any. The padding to fill in the registers completely alleviates the need for partial writes to the registers.

In the preferred embodiment, two instructions permit data transfer from the integer register file to the floating point register file. Two other instructions permit data transfer in the opposite direction. Multiplexers are used in the switching circuit to control the bit transfer. Furthermore, the data transfer scheme allows for both numeric and Booleans to be transferred and compounding of Booleans can be performed.

By utilizing a coupling scheme which is a compromise between no coupling and full coupling between floating point and integer units, a reliable and rapid transfer of data can be achieved without the complexities of substantial additional circuit components and/or interconnects, as well as additional microcode instructions. This increased efficiency results in reduced development time and reduced "chip" area. Also, the scheme allows for performance improvement in focal areas, such as frequency of operation, and allows for shorter design schedule and less design cost. All of these factors translate into improved overall performance at less cost.

DETAILED DESCRIPTION OF THE PREFERRED EMBODIMENT

Figure 1:
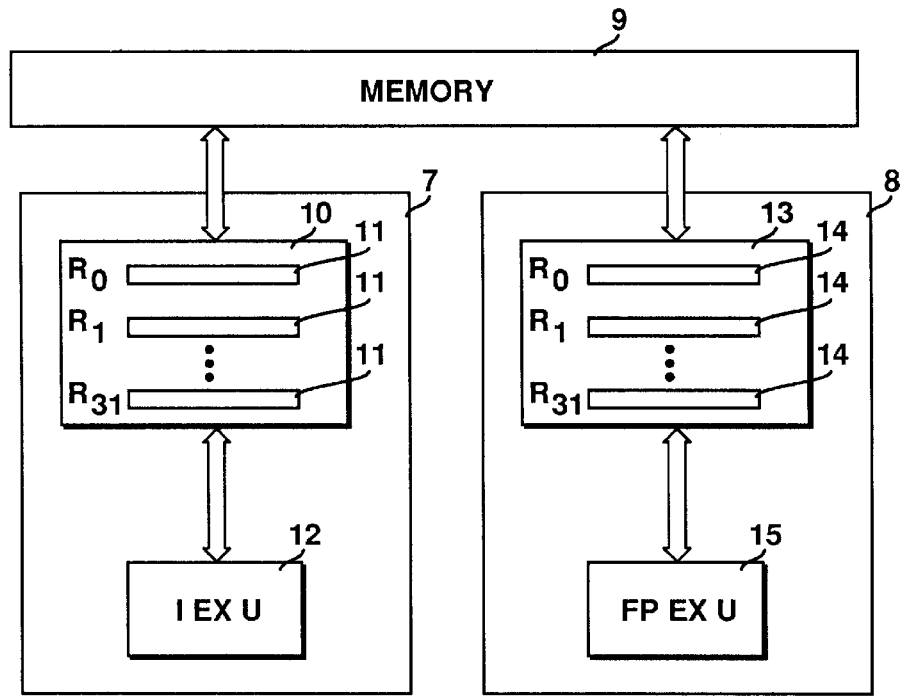
FIG. 1 is a block circuit diagram showing a prior art decoupled floating point and integer units.

A moderately coupled floating point and integer units for use in a processor is described. In the following description, numerous specific details are set forth, such as specific registers, arithmetic and logic execution units, bit length formats for data words, transfer instructions, etc., in order to provide a thorough understanding of the present invention. However, it will be obvious to one skilled in the art that the present invention may be practiced without these specific details. In other instances, well known techniques and structures have not been described in detail in order not to unnecessarily obscure the present invention. It is to be noted that a preferred embodiment of the present invention is described in reference to an 80-bit extended precision (also referred to as extended precision) bit-length format (64-bit mantissa, 15-bit exponent and one sign bit). However, it is readily understood that other embodiments can be designed and implemented without departing from the spirit and scope of the present invention. Furthermore, it is appreciated that the present invention is described as being embodied within a microprocessor "chip", however, the invention can be readily implemented in other types of processing devices as well.

It is to be noted that the use of integer and floating point units for providing arithmetic and logical calculations is well known in the art. These units can be configured separately from a microprocessor to provide the arithmetic (or logical) operations on data. However, it is generally understood that "state-of-the-art" microprocessors will include both of these units as part of the microprocessor "chip." Additionally, it is further understood that data stored in some form of memory will be accessed by one or both of these numeric units.

As earlier described in the Background section above, it may be necessary to perform calculations that resemble integer manipulation on a floating point value and floating point manipulation on an integer value. Thus, it may be necessary for a particular data type in one numeric unit to be operated on in the other numeric unit. Some examples of such operations have been earlier described, but are reiterated below. It is appreciated that these examples are not the only operations available and are being provided herein for illustrative purpose only.

1) Exponent operation: Adding integer value to an exponent of a floating point number to scale the number.

2) Sign operation: Reversing the sign of a number.

3) Mantissa operation: Inserting or OR'ing in (also referred to as "jamming") explicit 1s into any of the mantissa positions in order to clamp a number to a certain defined value.

4) Boolean operation: Compounding Boolean values generated as a result of integer compares, as well as floating point compares.

5) Inter-conversion operation: Multiplying a floating point value with an integer value currently in the integer register file, which will require the movement of the integer value to the floating point register file and converting it into floating point format.

In conjunction with the requirement for the conversion of data, the way in which the integer and the floating point units are coupled also dictates the manner in which data is moved between the two numeric units. A variety of techniques are known in the art for coupling integer unit(s) to floating point unit(s) to effect data transfer between the units. However, as was again noted in the Background section above, there are "trade-offs" on selecting the type of coupling to use. Closely coupled floating point and integer units provide substantial data manipulation capability, but at the cost of added complexity that usually requires additional components and interconnects on the "chip" which results in slower frequency performance for that processor. Alternatively, sparsely coupled floating point and integer units provide simplicity and less circuit structure, but in return sacrificing some of the data manipulation capability.

Prior Art

Referring to FIGS. 1–4, various prior art schemes for coupling floating point and integer units are shown. In FIG. 1, a fully decoupled scheme is shown. In this particular example, no direct coupling exists between an integer unit 7 and a floating point unit 8. The data which is to be operated on is obtained from a source, such as a memory 9 shown in FIG. 1. It is appreciated that the data is typically stored in some location, but the actual location where that data is obtained is not critical to the understanding of the invention. In the example, the integer unit 7 obtains data from memory 9, operates on that data and then returns the new data to memory 9.

The integer unit is comprised of an integer register file 10 and an integer execution unit 12. The integer register file 10 is usually comprised of a plurality of registers 11. For example, a typical register file 10 may include thirty-two registers 11 (referenced such as R0–R31) and in which each register is 32 bits in length. The registers 11 of the register file 10 are coupled to one or more integer execution units. In the example of FIG. 1, only one integer execution unit 12 is shown.

Similarly, a separate floating point unit 8 is used to provide floating point operations on data acquired by floating point unit 8. Again, the data is transferred via memory 9 or stored in memory 9. The floating point unit 8 is also comprised of a plurality of floating point registers 14 (referenced as R0–R31 also), configured into a floating point register file 13, and a floating point execution unit 15. The floating point registers 14 are usually of longer bit length than the integer registers 11. Thus, for example, if register 11 is a 32-bit register, register 14 may be of 64 bits (double precision) or 80 bits (extended precision).

In the decoupled arrangement, the integer unit 7 and the floating point unit 8 transfer data to each other through memory 9. No direct transfer of data is achieved between the two units 7 and 8. Furthermore, because of a lack of coupling between the two units 7 and 8, no other information is transferred between these two units 7 and 8 as well. Therefore, due to the lack of direct coupling between the two units 7 and 8, the coupling arrangement is defined as "decoupled" in the example of FIG. 1. The decoupled structure provides for simplicity in design which requires less circuit components and interconnects relating to integer and floating point transfers. However, the data manipulation is somewhat limited, since data transfer between the two units 7 and 8 will need to be arbitrated through memory 9, which limits the speed at which data can be transferred, forcing the latency of the operation to be several processor clock cycles. The speed limitation is imposed by the speed of the required load and store operations to/from memory 9.

Figure 2:
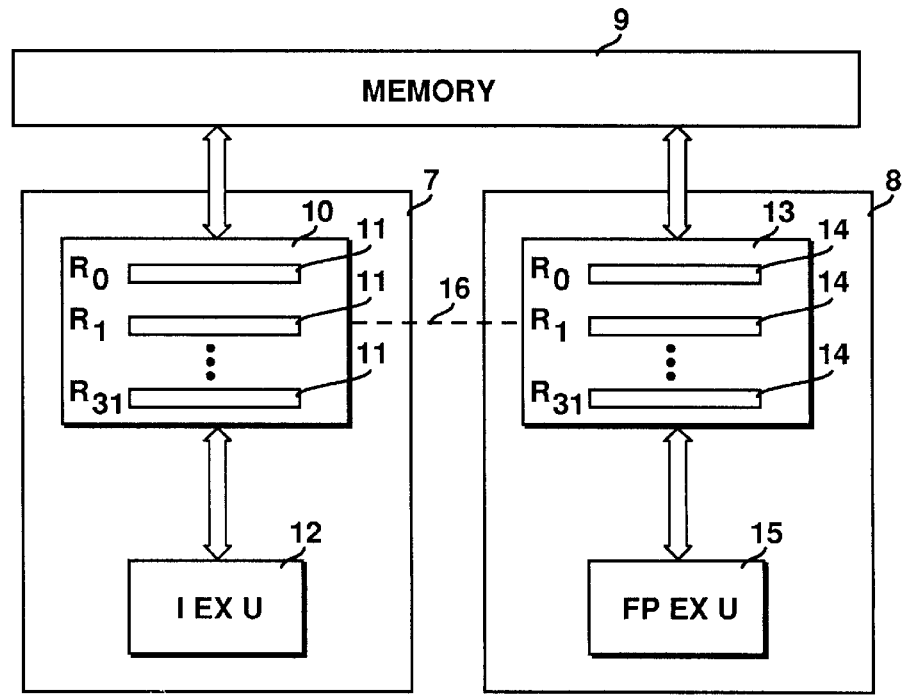
FIG. 2 is a block circuit diagram showing a prior art sparsely-coupled floating point and integer units.

In FIG. 2, a slight modification to the decoupled arrangement of FIG. 1 is shown. The structure of FIG. 2 is essentially that of FIG. 1, except for a sparse coupling (shown by dotted line 16) between the integer unit 7 and the floating point unit 8. Accordingly, the coupling arrangement is termed "sparsely coupled." In the sparsely coupled structure, some information is conveyed between the two units 7 and 8. The sparse coupling 16 provides for some status information (such as exception status, conditions or Boolean status) to be coupled, but no data is permitted to be transferred directly between the two units 7 and 8. The data transfer is still achieved through memory 9. An example of a sparsely coupled arrangement is the 80386 microprocessor's numeric ISA, which utilized a 16-bit connection between its integer and floating point units to transfer status information.

Figure 3:
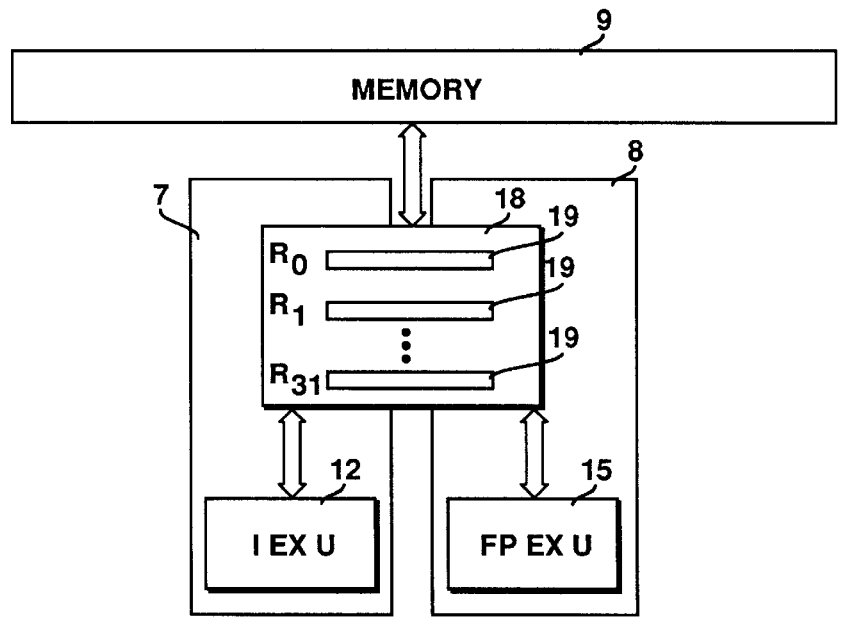
FIG. 3 is a block circuit diagram showing a prior art fully-coupled floating point and integer units having a unified register file.

In FIG. 3, another coupling arrangement is shown. In this coupling scheme, only one register file 18 is utilized. As shown, register file 18 is coupled to memory 9. The register file 18 is comprised of a plurality of registers 19, similar to the integer register file 10 of the earlier Figures. The register file 18 holds values in both integer and floating point formats. The required conversion and manipulation for the floating point data is performed in the floating point unit 8. Because all of the execution units are coupled to the single register file 18, the structure of FIG. 3 is referred to as a "closely" (or "fully") coupled arrangement.

Although the use of only a single register file 18 provides for simplicity, the lack of a second register file slows the computation capability and makes it inefficient when the format widths differ significantly (such as when extended precision floating point format is used). If, for example, registers 19 are 32-bit registers, then single and double precision calculations can be achieved by storing data in one and two registers, respectively. Converting from integer to floating point format (as well as from floating point to integer) is only slightly complicated. However, when extended precision is utilized, additional difficulties are encountered in manipulating the 80-bit format. A more significant disadvantage is that parallel computation of integer and floating point execution streams cannot be performed. Also, there is more likelihood that save and restore operations will need to be performed more often with a single register file. Thus, it is preferable to use separate register files for integer and floating point units.

Figure 4:
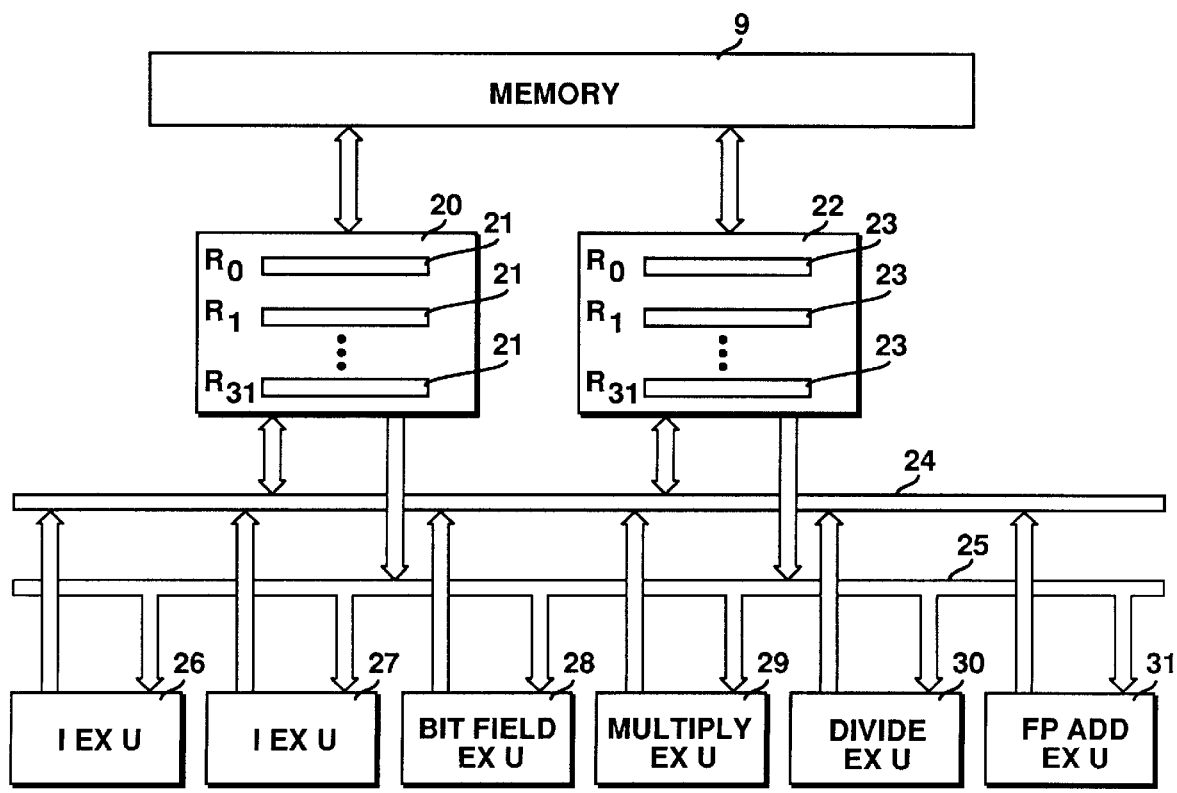
FIG. 4 is a block circuit diagram showing a prior art fully-coupled floating point and integer units having separate register files with complex interconnections.

In FIG. 4, a fully coupled structure which utilizes two separate register files is illustrated. The first register file is a general register file 20, similar to the register file 10 shown in FIG. 1. The general register file 20 is comprised of a plurality of registers 21. In a typical configuration there are thirty-two registers 21, each being 32 bits in length. The second register file is an extended register file 22 which is comprised of a plurality of extended registers 23. In a typical configuration there are thirty-two registers 23, each being 80 bits in length. The 80-bit length corresponds to the format for providing extended precision calculations. Each of the register files 20 and 22 are coupled to memory 9 for operating on data stored in memory 9.

Each of the register files 20 and 22 are coupled to a plurality of execution units by two buses 24 and 25. In the example of FIG. 4, bus 24 is bi-directional while bus 25 is unidirectional (allowing data flow from the register files to the execution units). Also in the example, six separate execution units 26–31 are shown coupled to buses 24 and 25. Units 26 and 27 are integer execution units for providing integer arithmetic and logical instructions (but not integer multiply or divide). Unit 28 is a bit-field unit. Unit 29 is a multiply execution unit for providing the multiplication operation on all integer and floating point multiplies. Unit 30 is a divide execution unit for providing the divide operation on all integer and floating point divides. Unit 31 is a floating point add execution unit which provides for all floating point operations except multiply and divide. Unit 31 also provides the integer-floating point conversion of data. It is appreciated that the execution units are coupled to the buses 24 and 25 in order to operate on data from either or both of the register files 20 and/or 22.

As noted in the Figure, the fully-coupled structure allows optimum flexibility in the manipulation of data by each of the register files 20 and 22. Since each register file 20 and 22 is coupled to provide data transfer on buses 24 and 25, data transfer can be achieved to any of the execution units 26–31, if desired. Thus, registers 21 can operate in single and double precision format in both integer and floating point format. The extended registers 23 are utilized to operate on all floating point formats. Thus, substantial flexibility is available to manipulate data in a fully-coupled arrangement. An example of a fully-coupled arrangement is implemented in a MC88110 reduced instruction set computing (RISC) microprocessor manufactured by Motorola, Inc.

Although the fully coupled arrangement provides for significant calculating capability and data manipulation, it achieves this advantage by sacrificing in other areas. Namely, the additional complexity that is required for obtaining the fully-coupled structure. For example, additional ports and bus arbitration are necessary for data transfer to and from the register files 20 and 22, partly due to the connection of the buses to the integer and floating point execution units. The interconnection of execution units to both register files 20 and 22 requires additional complexity and arbitration, which requires additional circuit connections.

As noted previously in the Background section, the additional circuitry and interconnects add loading capacitance that slows the frequency of operation of the circuits and ultimately the processor. This reduced frequency of operation is not only to the data transfer between the two numeric units, but affects overall processor speed as well. It is noteworthy to point out the current scaling trend where the speedup on devices (transistors) seen on successive generations of process technology is more than the speedup on the interconnect. Interconnect delays will take up larger fractions of the processor cycle time in the future. Strict interconnect management will most likely be necessary, in order to design in only the most important interconnect structures. The invention represents a step in this direction.

Present Invention

Figure 5:
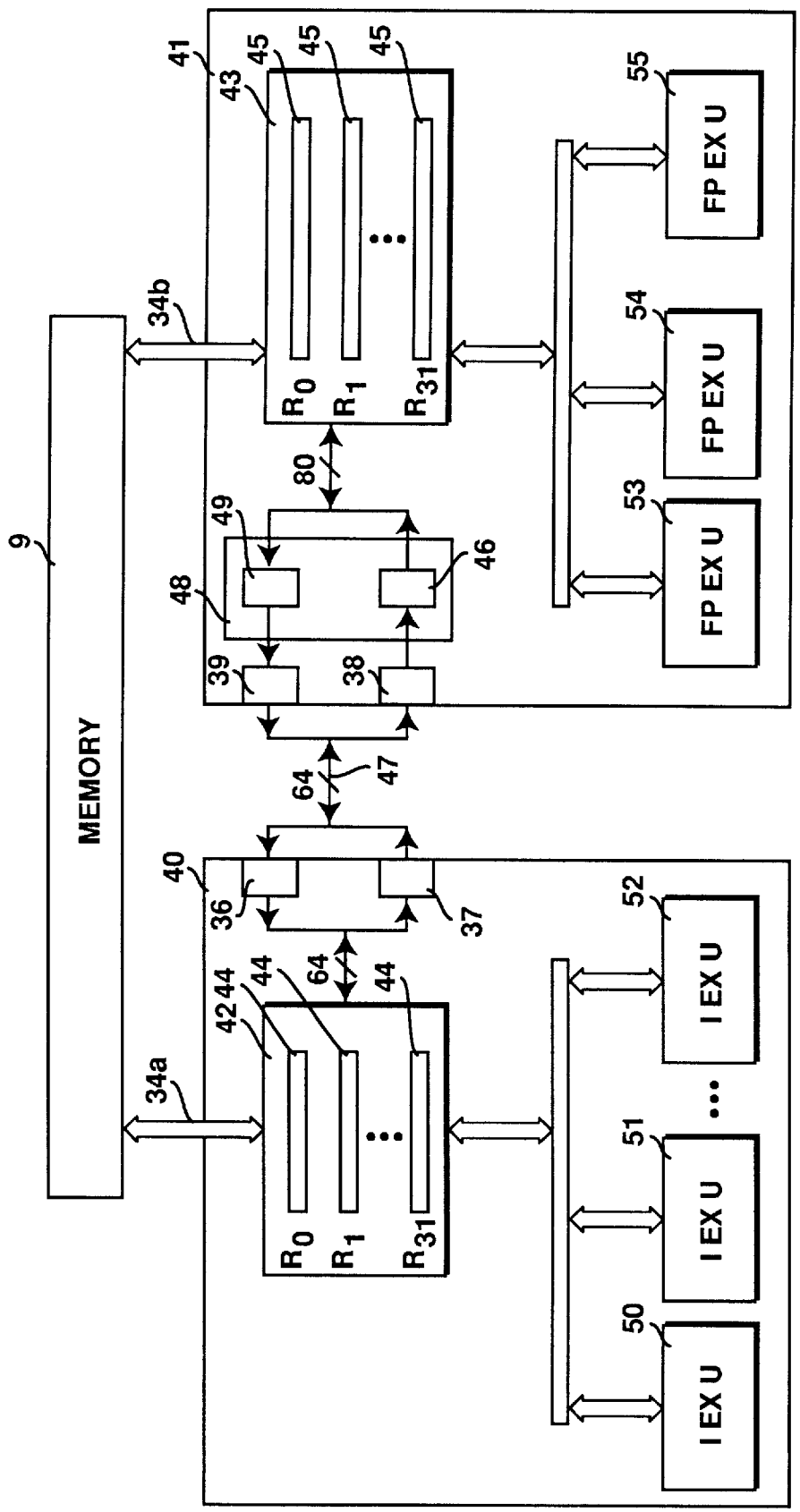
FIG. 5 is a block circuit diagram showing a moderately-coupled floating point and integer units of one embodiment of the present invention.

Referring to FIG. 5, a technique of the present invention for providing coupling between integer and floating point units is shown. The coupling arrangement of the present invention is referred to as "moderately coupled" since it provides more coupling than the scheme shown in FIGS. 1–2, but less than the full coupling scheme of FIGS. 3–4. Essentially, the coupling scheme of the present invention resides between the two extremes of the earlier Figures in terms of complexity. Accordingly, the present invention has certain coupling limitations when compared to the fully-coupled structure, but overall has enhanced performance by providing an efficient solution for the most common operations and simultaneously allowing for a higher frequency of operation. Key elements of the present invention include (but are not limited to) the specific choice of the coupling mechanism and the instructions that program the switching structure.

In the coupling arrangement of the preferred embodiment shown in FIG. 5, an integer unit 40 includes an integer register file 42, which is coupled to memory 9. The integer unit 40 is utilized to provide operations other than floating point operations. A separate floating point unit 41 is utilized to provide all floating point operations. The floating point unit 41 includes a floating point register file 43, which is also coupled to memory 9. Thus, data is moved between memory 9 and the register file 42 by bus 34a and between memory 9 and register file 43 by bus 34b. It is generally understood that buses 34a and 34b are actually the same bus coupling memory 9 to both numeric units 40 and 41.

It is also appreciated that well-known components and units associated with a microprocessor are not shown in FIG. 5, since the understanding of those units (such as, for example, a bus interface unit) are not essential to the understanding of the present invention. Furthermore, it is appreciated that although only one memory is shown, memory 9 of FIG. 5 can be comprised of multiple or different memories. For example, it is typical in a computer system to have at least one level of cache memory (usually resident on the processor chip), a RAM (random-access-memory) main memory and a non-volatile mass storage memory (such as a magnetic storage media). Thus, memory 9 can represent any one or all of these memory devices. Additionally, bus 34 may actually be comprised of more than a single bus, such as in the instance where multiple bus levels are used to couple data to and from memory 9 if memory 9 is configured to be distant from the register files 42 and 43.

Both register files 42 and 43 are each comprised of a plurality of registers 44 and 45, respectively. Although the actual number of such registers is a design choice, it is typical to have a number of registers equal to an exponential value of two. Accordingly, it is typical to have 32 or 64 such registers in each of the register files 42 and 43. In the preferred embodiment, there are thirty-two integer registers 44 in the integer register file 42 and thirty-two floating point registers 45 in the floating point register file 43 (noted as registers R0–R31 in each of the register files in FIG. 5). However, again the actual number of such registers is a design choice.

Similarly, the bit-length of the registers is also a design choice dependent on the processor architecture. Although 32-bit registers can be readily utilized, integer registers 44 of the preferred embodiment are 64-bit registers in order to provide larger addressing capability. Since it is anticipated that addressing and data transfers to and from memory 9 will be accomplished utilizing a 64-bit architecture with the newer generations of microprocessors, the preferred embodiment adapts to this newer convention. The floating point registers 45 of the preferred embodiment are 80-bits in length in order to accommodate the extended precision format.

A plurality of integer execution units are coupled to the integer register file 42. Although only three integer execution units 50–52 are shown, the actual number is a design choice. Likewise, a plurality of floating point execution units are coupled to the floating point register file 43. Again, only three such floating point execution units 53–55 are shown, but the actual number is a design choice. How these execution units are utilized is also a design choice. For example, unit 53 can be for floating point addition, unit 54 for floating point multiplication and unit 55 for floating point division. It is to be noted that the execution units of each numeric unit (integer or floating point) are not shared by the other numeric unit. Thus, integer execution units are isolated from the floating point unit 41, while floating point execution units are isolated from the integer unit 40.

A bi-directional bus 47 is employed to effect a coupling for direct data transfer between the two register files 42 and 43. That is, registers 44 are coupled to registers 45 by bus 47. All data transfers between the two register files 42 and 43 are accomplished as direct transfers on the bus 47. In the preferred embodiment, a switch 48 is used as a switching circuit for controlling the trans-positioning of the bits during the transfer from one numeric unit to the other. As will be described below, the transfer of the bits from a register of one numeric unit to a register of the other numeric unit requires some bit manipulation due to the difference in the format and the bit-length of the registers 44 and 45. The switch 48 is shown as part of the floating point unit 41, but it is appreciated that the actual location of such circuitry is a design choice.

As noted, in the practice of the present invention, all floating point operations are performed in the floating point unit 41 while other operations, including integer operations, are performed in the integer unit 42. Whenever an operation requires a data transfer from one numeric unit to the other, data stored in one of the register files 42 or 43 is directly transferred to the register file of the other numeric unit through the bus 47. In order to achieve this data transfer by the bus 47, a pair of data ports (a read port and a write port) are needed for each numeric register file. As shown in FIG. 5, a read port 36 and a write port 37 are used to couple data to and from the bus 47 and the integer registers 44. In the floating point unit, a read port 38 and a write port 39 are used to couple data to and from the bus 47 and the floating point registers 45.

Although the design of these data ports 36–39 is a design choice, it should be noted that three of these ports already exist within typical high performance microprocessors which utilize floating point units. For example, an integer unit read port and a floating point write port are typically available for executing a floating point load operation. Additionally, a floating point read port is currently available for executing a floating point store operation. Thus, the implementation of the present invention requires the addition of an extra write port 37 in the integer unit 40. The capacitive loading is minimized since only one additional port is required for one embodiment of a future microprocessor.

It is to be appreciated that the coupling scheme of the present invention also allows Booleans to be transferred between the register files. Logical operatives, such as Booleans (for example, a>b), can be transferred directly between the two units 40 and 41 as well. Also, operations requiring a compounding of Booleans (for example, a>b AND c<d) can be transferred between the register files 42 and 43. An example of an operation to compound Booleans is shown in FIG. 6.

Figure 6:
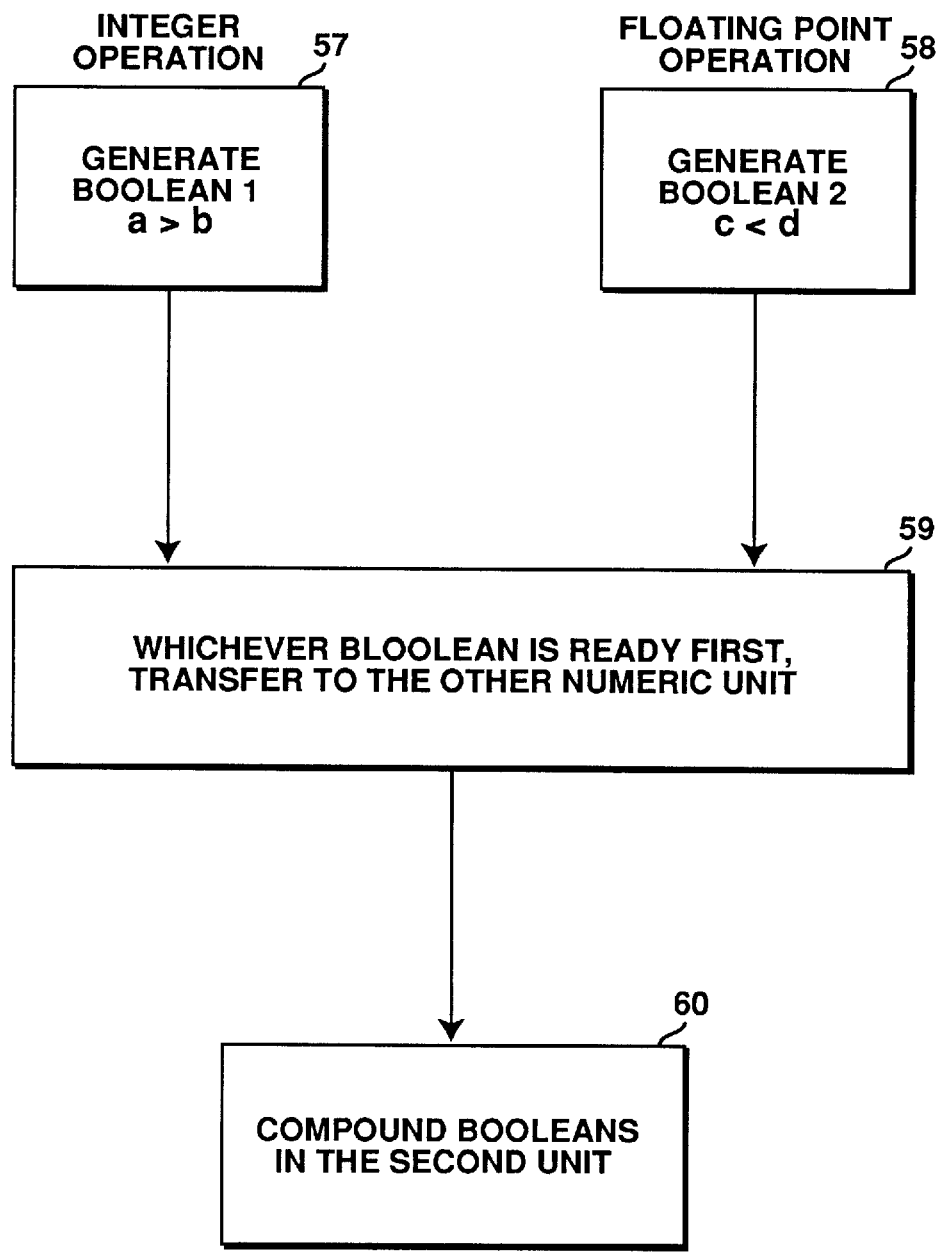
FIG. 6 is a block diagram illustrating an operation of compounding Booleans generated in the integer unit and in the floating point unit.

In FIG. 6, the compounding of Booleans noted above is illustrated. In the example, the Boolean a>b is defined as an integer operation and the Boolean c<d is defined as a floating point operation (a and b are values stored in integer registers 44 and c and d are values stored in floating point registers 45). Thus, a>b comparison analysis is performed in the integer unit 40 and c<d comparison analysis is performed in the floating point unit 41. As noted in blocks 57 and 58, the a>b and c<d Booleans are solved separately in the respective numeric units. Next, as noted in block 59, the first Boolean to be solved is then transferred to the other numeric unit. The transferred Boolean is then compounded (the AND operation noted in the above example) with the second Boolean, as shown in block 60, to obtain the final result. Thus, the present invention permits a streamlined approach to solving the compounding of Booleans in which the Booleans are in integer and floating point formats.

An implementation of the data transfer in the preferred embodiment is described and illustrated in reference to FIGS. 7–10. It is appreciated that the integer registers 44 are 64 bits in length to accommodate a 64-bit integer value. The floating point registers 45 are 80 bits in length to accommodate an 80-bit extended precision floating point value. The afore-mentioned IEEE standard specifies a 64-bit mantissa, a 15-bit exponent and a single sign bit. The conversion of integer to floating point values and vice versa are well known in the art and are typically performed in the floating point unit 41. Since the integer registers have the shorter bit length, bus 47 is designed as a 64-bit bus for the data transfer between the two numeric units 40 and 41. Furthermore, in order to transfer the information (data and Booleans) between the two register files 42 and 43, the preferred embodiment implements the use of four instructions identified below. These instructions are part of the instruction set of the processor architecture.

Figure 7A:
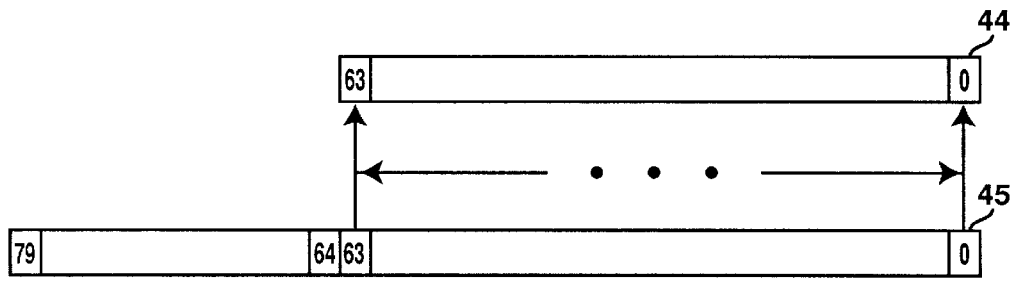
FIG. 7A is an illustration showing a transfer of a mantissa field of an 80-bit floating point register to a 64-bit integer register.
Figure 7B:
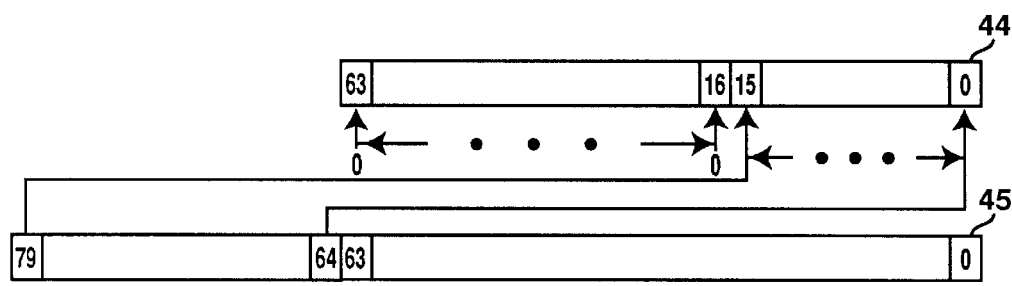
FIG. 7B is an illustration showing a transfer of sign and exponent fields of an 80-bit floating point register to least significant bits of a 64-bit integer register.
Figure 7C:
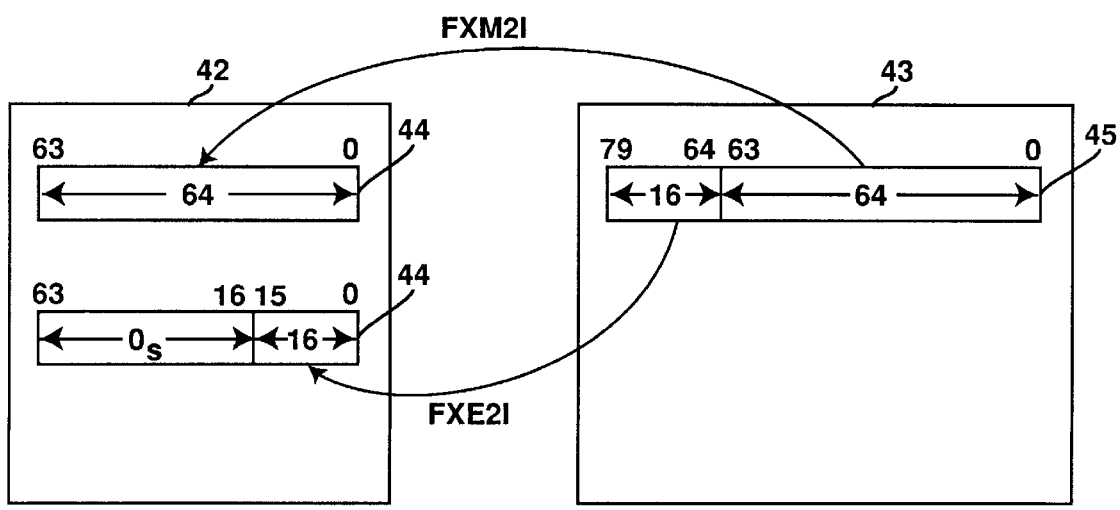
FIG. 7C is an illustration showing integer and floating point register pairings when the transfers shown in FIGS. 7A–B are executed.

As shown in FIG. 7A, an instruction FXM2I moves the lower 64 bits (bits 63:0) forming the mantissa of an 80-bit extended precision word from a selected register 45 to a selected register 44 on bus 47. Note that all bit positions of the receiving register 44 are filled (bits 63:0). FIG. 7C illustrates the result of the transfer of data when FXM2I is executed. FIG. 7B shows the operation when an instruction FXE2I moves the most significant 16 bits (bits 79:64), which form the sign and exponent field. This transfer is also illustrated in FIG. 7C. However, note that in most instances the sign/exponent field will be transferred to a second register 44, so that when FXM2I and FXE2I are executed, an 80-bit floating point value is moved into two integer registers, one containing the mantissa value and the other the sign/exponent value. Thus, the above two instructions permit the transfer of the floating point field to two integer registers.

Figure 8:
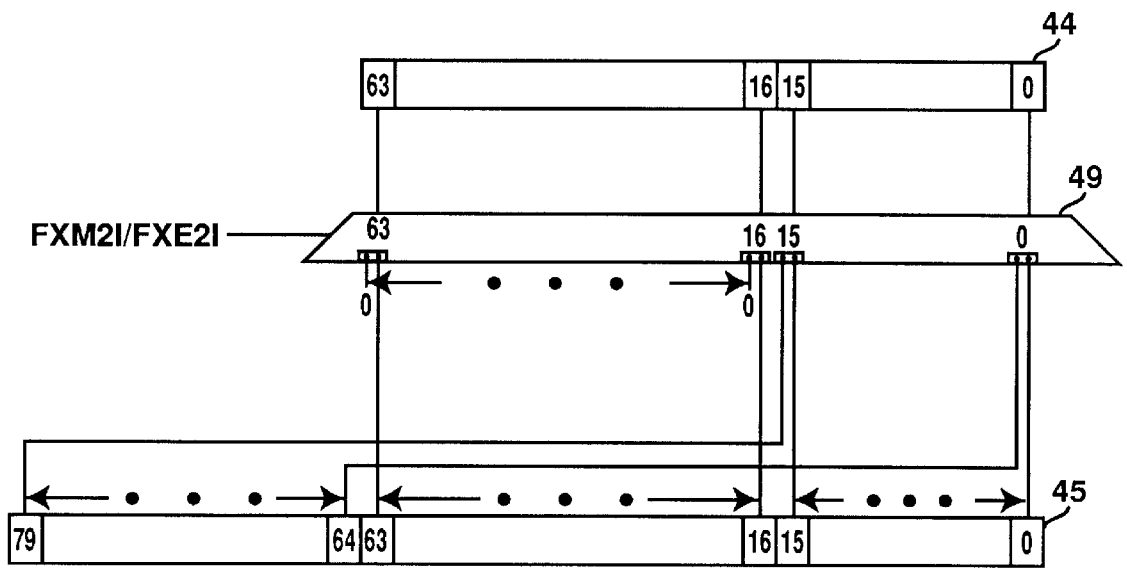
FIG. 8 is an illustration showing a use of a multiplexer to effect the bit transfers of FIGS. 7A–C.

As shown in FIG. 8, a multiplexer (mux) 49 is used as part of the switch 48 to effect the proper transfer of bits from the floating point register file 43 to the integer register file 42. In this example, bits 63:0 (read bits 0 through 63) are coupled as first inputs to a 64 position mux 49. Bits 79:64 are coupled as second inputs to mux positions 15:0. The second inputs of mux 49 for positions 63:16 are filled with 0s. Thus, when the instruction FXM2I is executed, mux 49 transfers bits 63:0 of a selected floating point register 45 to a selected receiving register 44. When the instruction FXE2I is executed, mux 49 transfers bits 79:64 of a floating point register 45 to bit positions 15:0 of a receiving register 44. Bits 63:16 of the receiving register 44 are filled (padded) with 0s. As noted above, when all 80 bits are to be transferred, bits 63:0 are moved to a receiving register 44 with the execution of instruction FXM2I and bits 79:64 are moved to bit positions 15:0 of a second receiving register 44. As was noted, bit positions 63:16 of the second register 44 are padded with 0s. The 64-bit output of mux 49 is coupled to the bus 47.

It is to be appreciated that the padding with 0s into unused portions of a receiving register has advantages. Primarily, partial writes to register files are not encountered. Thus, no partial transfers need to be accounted for when a data transfer occurs between the two register files.

Figure 9A:
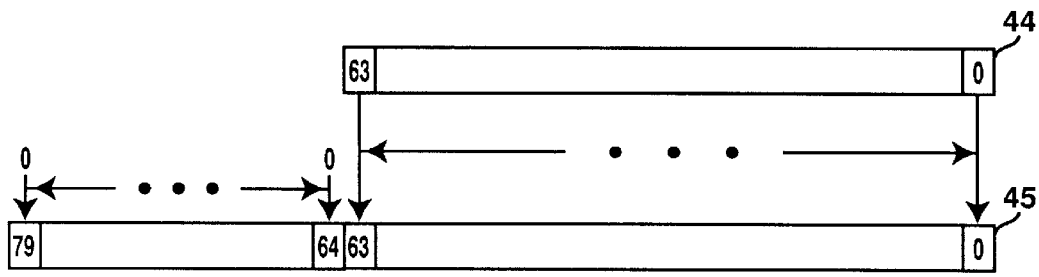
FIG. 9A is an illustration showing a transfer of 64 bits of a 64-bit integer register to a mantissa field of an 80-bit floating point register.
Figure 9B:
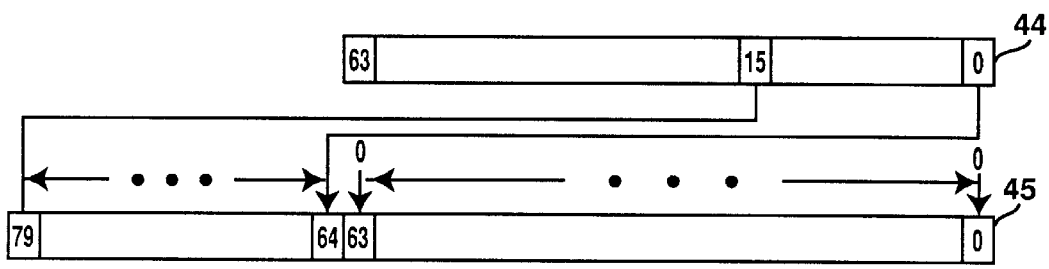
FIG. 9B is an illustration showing a transfer of 16 least significant bits of a 64-bit integer register to sign and exponent fields of an 80-bit floating point register.
Figure 9C:
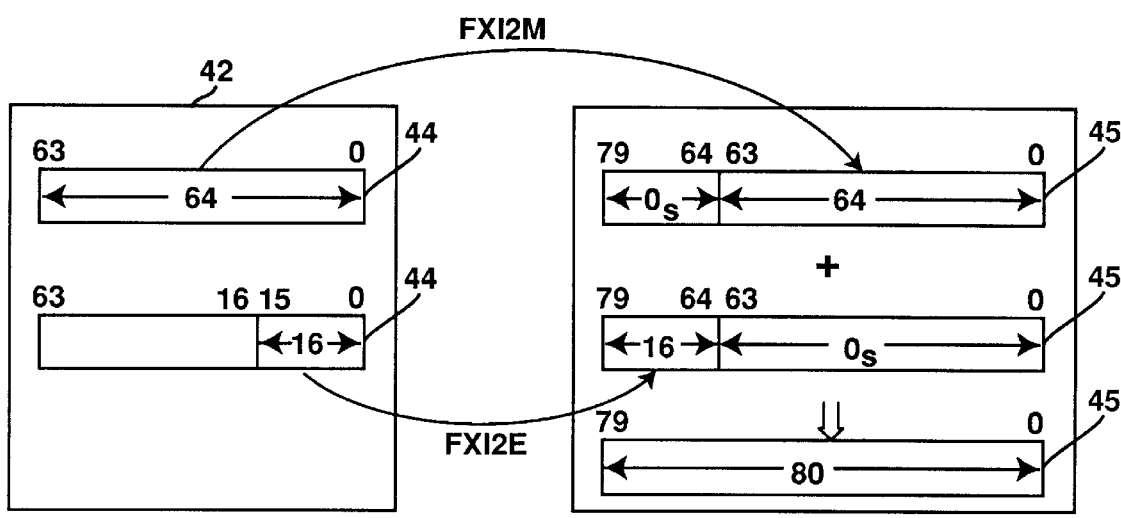
FIG. 9C is an illustration showing integer and floating point register pairings when the transfers shown in FIGS. 9A–B are executed.

When bit transfer from the integer register file 42 to the floating point register file 43 is desired, the reverse is implemented. As shown in FIG. 9A, an instruction FXI2M moves all 64-bits from one of the integer registers 44 to the mantissa bit position (bits 63:0) of a receiving register 45. The upper bits 79:64 are padded with 0s. The transfer effected by the instruction FXI2M is shown in FIG. 9C. In FIG. 9B, an instruction FXI2E moves the lower 16 bits (15:0) of an integer register 44 to the sign and exponent bit positions (bits 79:64) of a receiving register 45. The lower bits 63:0 are padded with 0s. This transfer is also shown in FIG. 9C. Both the FXI2M and the FXI2E instructions can be used to move an integer value that represents the mantissa and an integer value that represents the sign/exponent component from two integer registers 44 to the floating point register file 43. As implemented, the mantissa value is moved to one floating point register 45 and the sign/exponent component is moved to a second floating point register 45, as shown in FIG. 9C. Subsequently, a floating point OR operation is performed to logically OR the contents of the two receiving registers to form a single 80-bit extended precision value.

Figure 10:
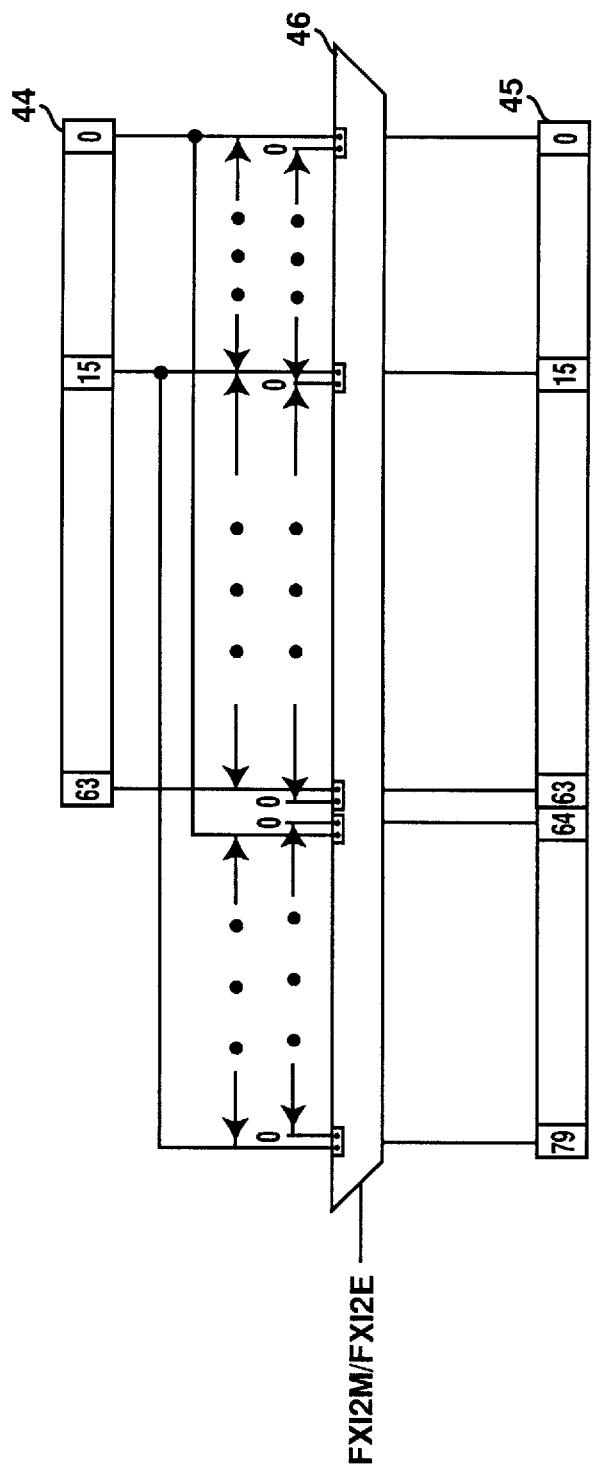
FIG. 10 is an illustration showing a use of a multiplexer to effect the bit transfers of FIGS. 9A–C.

As shown in FIG. 10, a mux 46 is used to provide the transfer of bits between the integer and floating point register files 42 and 43. Here mux 46 is also operating as part of switch 48. In the first instance all of the bits (bits 63:0) of a selected register 44 (through the bus 47) are coupled as first inputs to the first 64 positions of an 80 position mux 46. The first inputs of positions 79:64 are filled with 0s. The 80-bit output of mux 46 is coupled to the floating point registers 45. The first input positions of mux 46 are used for the mantissa transfer when the FXI2M instruction is executed. Bits 15:0 of a selected register 44 are coupled as second inputs to mux positions 79:64. The second inputs of mux positions 63:0 are filled with 0s. The second input positions are used when the FXI2E instruction is executed to transfer the least significant 16-bit integer value to the sign/exponent field in a floating point register. Again, as noted earlier, the padding of zeroes ensure that no partial writes of the register files are encountered.

It is appreciated that the bit switching achieved by the operation of the muxes 46 and 49 can be performed in other ways, as well with other devices. The muxes are shown herein for exemplary purpose. Furthermore, the location where the switching can be effected is also a design choice and need not be performed at the exact location shown by the muxes 46 and 49 in FIG. 5.

The moderately coupled integer and floating point arrangement of the present invention has a number of advantages. Completely separate units provide for integer and floating point operations. The only direct coupling of data between the integer and floating point register files is achieved through a single bus. Thus, integer and floating point operations are isolated from each other, but data as well as Booleans, can be transferred between the two units. The present scheme also permits for the conversion of integer and floating point data.

Integer data is first moved to the mantissa field of a floating point register using FXI2M instruction. This is followed by an explicit floating point to integer format conversion operation that reads an integer value from the mantissa field of the floating point register file, converts it to a floating point format and writes the results to a destination floating point register. Conversely, another operation reads a floating point value from a floating point register, converts it into an integer in integer format and writes the integer to the mantissa field of a floating point register, padding (filling) the exponent and sign fields with zeros. Subsequently, a transfer instruction FXM2I can be used to move this value to the integer registers. Thus, because the conversion operation is separated from the transfer operation, each can be executed independently of the other. Thus, overall, flexible techniques are available for examination and manipulation of components of floating point numbers.

Additionally, other operations can be supported by the practice of the present invention. For example, an operation such as "find first set" can be emulated. This operation looks at an integer number having an array of bits, wherein it is desirable to find the very first bit having a set ("1") value. This operation can be performed by using a normalization step in the floating point unit. The integer value is moved to a floating point register and the value normalized. Then the exponent value is moved back to the integer unit to be observed. The exponent value, now in an integer register, has a value corresponding to the bit position of the first set ("1") value. Thus, there are advantages in utilizing the set of four transfer instructions to perform other functions beyond the ordinary integer/floating point conversions.

Thus, a moderately coupled floating point and integer units is described.

I claim:

1. A processor for performing integer and floating point calculations comprising:

an integer processing unit including:
  an integer register file comprising a plurality of integer registers for storing integer data, each integer register having a first bit length;
  first read and write ports coupled to said integer register file;
a floating point processing unit including:

a floating point register file comprising a plurality of floating point registers for storing floating point data, each floating point register having a second bit length, said second bit length being a non-integer multiple of said first bit length, with said non-integer being greater than one;

second read and write ports coupled to said floating point register file;

a bus coupling said first read and write ports with said second read and write ports, said bus being dedicated to data transfer operations between said integer and floating point register files;

an instruction set that includes first, second, third and fourth instructions, execution of said first and second instructions transferring a first floating point word from a first floating point register to first and second integer registers, execution of said third and fourth instructions transferring data from third and fourth integer registers to second and third floating point registers, respectively; and a switching circuit coupled between said floating point register file and said second read and write ports, said switching circuit controlling the trans-positioning of bits during data transfer between said integer and floating point register files.

2. The processor of claim 1 wherein said bus comprises a bi-directional bus.

3. The processor of claim 1 wherein said instruction set further comprises a fifth instruction, execution of said fifth instruction causing a logical OR operation to be performed on said second and third floating point registers, thereby producing a second floating point word.

4. The processor of claim 1 wherein execution of said first instruction transfers a mantissa value of said first floating point word to said first integer register, and execution of said second instruction transfers a sign and an exponent value of said first floating point word to said second integer register.

5. The processor of claim 1 wherein said first bit length is 64-bits and said second bit length is 80-bits, and wherein execution of said third instruction transfers bits 63:0 of said third integer register to a mantissa bit position of said second floating point register, and execution of said fourth instruction transfers bits 15:0 of said fourth integer register to sign and exponent bit positions of said third floating point register.

6. A computer system which includes a memory and a processor for performing integer and floating point calculations comprising:

an integer register file coupled to said memory, said integer register file including a plurality of integer registers, each having a first bit length;

an integer execution unit coupled to said integer register file which performs integer operations on data stored in said integer register file;

a floating point register file coupled to said memory, said floating point register file including a plurality of floating point registers, each having a second bit length, said second bit length being a non-integer multiple of said first bit length, with said non-integer being greater than one;

a floating point execution unit coupled to said floating point register file which performs floating point operations on data stored in said floating point register file;

integer read/write ports coupled to said integer register file;

floating point read/write ports coupled to said floating point register file;

a bi-directional bus coupling said integer and floating point read/write ports, said bi-directional bus being dedicated to data transfer operations between said integer and floating point register files;

an instruction set that includes first, second, third and fourth instructions, execution of said first and second transferring a first floating point word from a first floating point register to first and second integer registers, execution of said third and fourth instructions transferring data from third and fourth integer registers to second and third floating point registers, respectively; and means for trans-positioning bits during data transfer between said integer and floating point register files across said bi-directional bus.

7. The computer system of claim 6 wherein said trans-positioning means comprises a switching circuit coupled between said floating point register file and said floating point read/write ports.

8. The computer system of claim 6 wherein said instruction set further comprises a fifth instruction, execution of said fifth instruction causing a logical OR operation to be performed on said second and third floating point registers, thereby producing a second floating point word.

9. The computer system of claim 6 wherein execution of said first instruction transfers a mantissa value of said first floating point word to said first integer register, and execution of said second instruction transfers a sign and an exponent value of said first floating point word to said second integer register.

10. The computer system of claim 6 wherein said first bit length is 64-bits and said second bit length is 80-bits, and wherein execution of said third instruction transfers bits 63:0 of said third integer register to a mantissa bit position of said second floating point register, and execution of said fourth instruction transfers bits 15:0 of said fourth integer register to sign and exponent bit positions of said third floating point register.

* * * * *